ADJUSTABLE THERMOSTAT

Original Filed Nov. 29, 1968 4 Sheets-Sheet 1

INVENTOR
DONALD J. SCHMITT
BY
McNENNY, FARRINGTON,
PEARNE & GORDON

ADJUSTABLE THERMOSTAT

Original Filed Nov. 29, 1968 4 Sheets-Sheet 2

INVENTOR
DONALD J. SCHMITT
BY
McNENNY, FARRINGTON, PEARNE & GORDON
W. A. Hail

ADJUSTABLE THERMOSTAT

Original Filed Nov. 29, 1968 4 Sheets-Sheet 3

INVENTOR
DONALD J. SCHMITT
BY
McNENNY, FARRINGTON, PEARNE & GORDON
W W Tail

ADJUSTABLE THERMOSTAT

Original Filed Nov. 29, 1968 4 Sheets-Sheet 4

INVENTOR
DONALD J. SCHMITT
BY
McNENNY, FARRINGTON, PEARNE & GORDON
W A Jail

United States Patent Office

Re. 28,019
Reissued May 28, 1974

28,019

ADJUSTABLE THERMOSTAT

Donald J. Schmitt, Mansfield, Ohio, assignor to Therm-O-Disc, Incorporated, Mansfield, Ohio Original No. 3,573,700, dated Apr. 6, 1971, Ser. No. 779,680, Nov. 29, 1968. Application for reissue June 26, 1972, Ser. No. 266,446
Int. Cl. H01h *37/18, 37/24, 37/54*
U.S. Cl. 337—347 37 Claims

Matter printed in heavy brackets [ ] appears in the original patent but forms no part of this reissue specification; matter printed in italics indicates the additions made by reissue.

ABSTRACT OF THE DISCLOSURE

Bimetal free disc thermostats are disclosed which provide means for modifying the operating temperature of the disc and means for modifying the operating temperature differential of the disc. The operating temperature of the thermostat is adjusted by applying an adjustable biasing force to the snap disc urging it toward one position of stability. Adjustment of the force changes the temperature of operation without materially altering the displacement characteristics of the disc or the operating differential. The stability of the disc calibration is also improved by the biasing force which dampens the snap action. Operating temperature differential is adjusted by a biasing force applied to the disc only when the switch contacts are open. This latter force causes the disc to operate along one curve when the switch is closed and a displaced curve when the switch is open, thereby adjustably reducing operating temperature differential of the disc. A switch operator is arranged so that the kinetic energy of a mass in motion is available to break any contact welds. Further conventional disc structures may be arranged to operate at higher temperatures with relatively small operating temperature differentials by applying properly selected biasing forces to such conventional discs.

BACKGROUND OF INVENTION

This invention relates generally to thermostats and more particularly to a novel and improved adjustable thermostat utilizing a bimetallic disc as the temperature sensing operator.

Various types of bimetal operated thermostatic switching devices have been extensively used. One well-known type employs a flat blade of bimetallic metal, which is usually cantilever mounted, to open and close a switch in response to predetermined temperature conditions. One such type is generally known as a creep-type thermostat since the switch opens and closes slowly. An example of such a thermostat is disclosed in the U.S. Patent to Bletz, No. 3,358,101. Other bimetallic blade-type thermostats include a snapping device so that the switch opens and closes with a rapid snap movement. An example of this type of thermostat is disclosed in the U.S. Pat. No. 3,239,633 to Bletz.

Another well-known type of thermostatic switching device employs a snap disc formed of bimetallic material. In such devices it is customary to manufacture the disc so that it snaps to one position of stability when it reaches a first temperature and snaps back to its other position of stability when it reaches a second temperature different from the first temperature. Generally bimetallic snap disc thermostats are not adjustable, but rather operate at temperatures which are determined by the manufacturer of the disc itself.

The adjustable bimetallic blade-type thermostats, when carefully manufactured, function well if the loading conditions on the switch are not too severe. However, when the switch must be used to initiate and interrupt relatively large current loads, particularly of the type encountered in the control of induction motors and the like, difficulty of contact welding is often encountered. By careful design and manufacture of the switch, such devices can often be used with relatively large loads, but if contact welding does occur, for any reason, such bimetallic blade-type operators often do not provide sufficient power to break the weld and failures are encountered.

In bimetallic disc-operated thermostats contact welding problems are not particularly severe since disc operators usually provide a relatively high negative spring rate and consequently provide sufficient power to break any weld when one occurs. However, disc operators have not generally been used where temperature adjustment is required or when a differential between the two operating temperatures must be relatively small. Further such disc-type thermostats have not usually been used where the thermostat must operate at relatively high temperatures with relatively low operating temperature differentials.

SUMMARY OF INVENTION

The present invention provides several important aspects. In accordance with one important aspect of this invention, a novel and improved adjustable thermostat is provided which is operated by a free bimetallic snap disc. The snap disc is arranged to provide sufficient power to break a weld in the event the contacts become welded together. Further, the mechanism is preferably arranged so that the switch contacts open while the operating mechanism is in motion so that the kinetic energy of the mechanism is also available to assist in breaking a weld and to initiate contact opening. The temperature adjustment is provided by an adjustable biasing force applied to the disc. In one illustrated embodiment an adjustable spring is provided to apply a resilient force to the snap disc to change the operating temperatures of the disc. This spring not only functions to control the operating temperature of the disc, but also improves the operating accuracy of the disc throughout the life of the thermostat and simplifies the mounting of the disc in the thermostat.

In accordance with another important aspect of this invention, a narrow temperature differential thermostat is provided with a bimetallic snap disc operator. In such a thermostat the disc may be manufactured with a relatively large temperature differential and means are provided to modify the operating temperatures of the disc so that the effective differential temperature of the thermostat is drastically reduced. This reduction in the differential temperature of operation is accomplished without encountering contact welding problems since the thermostat is arranged so that the operating mechanism is in rapid motion when the contact opening is initiated and sufficient kinetic energy is available to break a weld if one is encountered.

In accordance with still another aspect of this invention, a novel and improved bimetallic snap disc operated thermostat is provided with a first adjustment to adjust the differential temperature of operation and a second adjustment for adjustment of the operating temperature of the thermostat. These adjustments function independently of each other, even though they both result in forces applied to the snap disc element.

In accordance with still another aspect of this invention, a novel and improved bimetallic snap disc thermostat is provided wherein the thermostat operates at relatively high temperature with a relatively low temperature differential of operation. In such a thermostat a biasing spring is employed to raise the operating temperature of the disc to a temperature range above the range of temperatures which have normally been possible with conventional bimetallic snap disc having a relatively low operating temperature differential.

In accordance with still another aspect of this invention, a novel and improved bimetallic snap operated thermostat is provided with a novel and improved switching structure which has operating characteristics adapted to cooperate with the actuation characteristics of the thermostat and its adjustment to provide improved results.

OBJECTS OF INVENTION

It is an important object of this invention to provide a novel and improved bimetallic snap disc operated thermostat.

It is another important object of this invention to provide a thermostat according to the preceding object which provides means to adjust the operating temperature of the thermostat.

It is still another object of this invention to provide a novel and improved thermostat according to either of the preceding objects wherein means are provided to adjustably reduce the operating temperature differential of the thermostat.

It is still another object of this invention to provide a novel and improved bimetallic snap disc thermostat which operates at relatively high temperatures with relatively low operating temperature differentials.

Further objects and advantages will appear from the following description and drawings wherein.

Before discussing the specific embodiments of this invention, it is believed that a brief discussion of the operating characteristics of snap discs will be useful.

Figure 2:
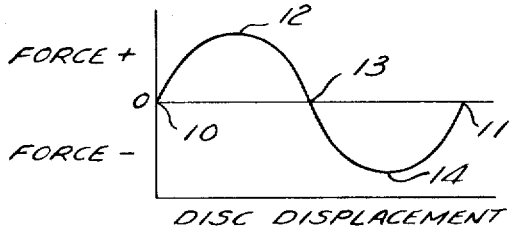
FIG. 2 is a force displacement diagram of a typical snap disc.

Referring to FIG. 2, a simple snap disc which is not formed of bimetal, but rather of a single homogeneous metal, has a force displacement curve of the type illustrated. In one position of stability 10 the force of the disc is zero. As the disc is deformed toward its opposite position of stability 11, a positive force is developed by the snap disc which increases to a maximum at about 12. Displacement beyond the position 12 causes a decrease in the positive force until a point 13 is reached wherein the force is zero and the disc is in its mid or snap over position. Displacement beyond the point 13 causes a negative force which builds to a maximum at a point about 14. Further displacement to the second stable position at 11 causes the negative force to return to zero. In the positions between the points 12 and 14, the disc provides a negative spring rate as indicated by the negative slope of the curve.

The curve illustrated in FIG. 2 approaches a harmonic curve. However, by various manufacturing procedures known to those skilled in the art, the snap disc can be manufactured to provide unequally sized lobes. For example, the upper lobe can be larger or smaller than the lower lobe. Further, discs can be manufactured to have a curve which lies entirely within the positive portion or entirely within the negative portion of the diagram. However, such disc snap devices provide the negative spring rate wherein further displacement from the adjacent position of stability causes a reduction in the force of spring. When a snap disc of this type is combined in a system wherein a force is applied to the disc which is a function of temperature, a snap-acting thermostat may be provided.

The function of thermosensitivity and the function of the negative spring rate for snap action can be combined in a single element when the disc is formed of bimetal. In its simplest form bimetallic snap discs are often utilized to operate switches to provide a thermostat which operates with snap action at predetermined temperatures which are determined by the manufacturer of the disc.

Figure 3:
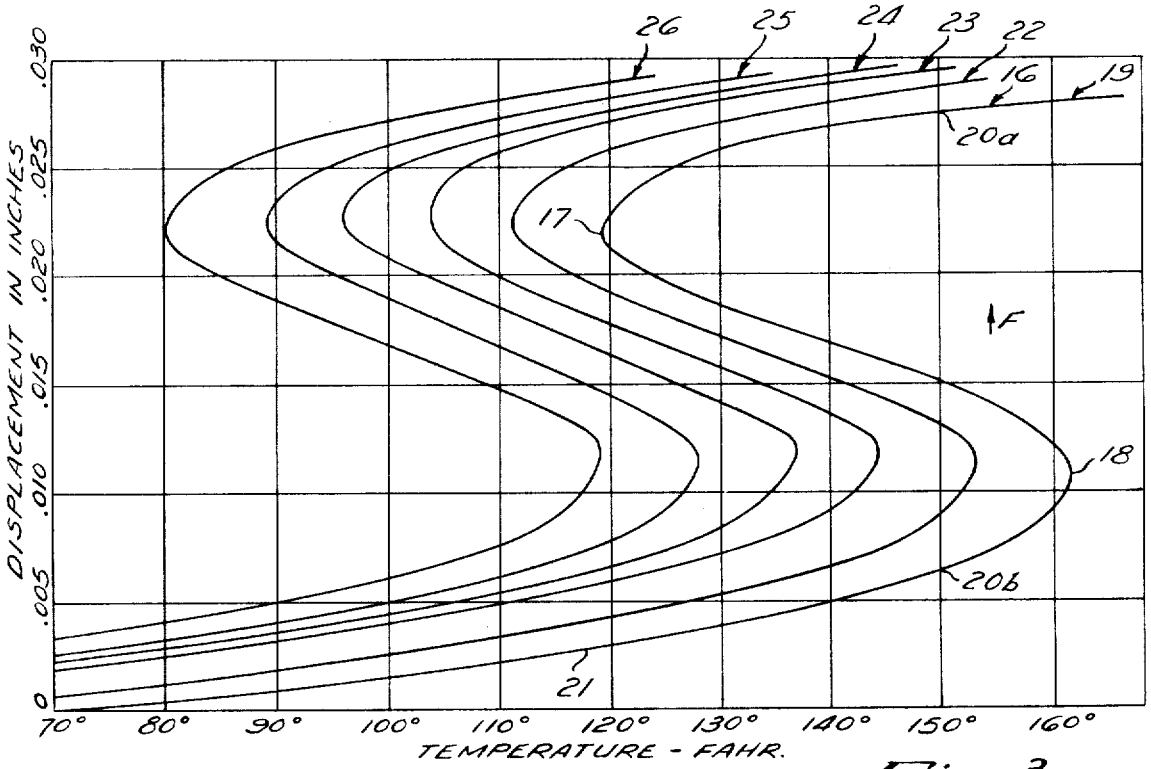
FIG. 3 is a diagram illustrating a family of curves obtained by loading a typical bimetallic snap disc with a biasing force having various values.

A force displacement curve of the type illustrated in FIG. 2 can be obtained with a bimetallic disc when such disc is maintained at a constant predetermined temperature. However, when the operating characteristics of a bimetal snap disc, under changing temperatures, are to be illustrated, a different form of diagram is preferable, wherein temperature is plotted against displacement. FIG. 3 is such a diagram.

It has been discovered that if a typical bimetallic snap disc is loaded with a constant or substantially constant force urging it toward one or the other of its positions of stability, the displacement curves can be shifted one way or another from the curve of an unloaded disc. Referring to FIG. 3, the curve 16 at the right-hand side of the family of curves was obtained from a typical bimetallic disc which was not subjected to a load in either direction. This S-curve 16 shows the displacement position of the disc versus temperature. The particular disc is considered a 45° F. differential disc since it snaps through from one position of stability to the other position of stability on decreasing temperature at the temperature indicated at 17 or about 118° F. On increasing temperature, the disc snaps through when a temperature of about 163° F. is reached at the location on the curve at 18.

If the disc is unloaded and the temperature is above 163° F., the position of the disc will be to the right of the point 19 on the curve 16. Similarly if the temperature of the disc is below about 118° F. and the disc is unloaded, the position of the disc will be to the left of the point 21 on the curve 16. At temperatures between about 118° F. and 163° F. the disc can be one or the other of two stable positions. For example, if the disc temperature is 150° F., the disc can be in either of the positions 20a or 20b. If the temperature decreases to 150° F. from above 163° F., the position of the disc will be at 20a between points 19 and 17 while if the temperature of the disc is increased to 150° F. from a temperature below 118° F., its position will be at 20b along the curve between the points 18 and 21. The disc is unstable in locations along the curve between 17 and 18 so unless the disc is restrained in its movement, stable positions along this portion of the curve will never occur. As temperature decreases through a temperature of 118° F., the disc will snap from the position 17 to position 21 and if the temperature increases through a temperature of 163° F., the disc will snap from the position 18 to the position 19 on the curve 16.

If the disc is loaded by a constant force urging it toward the position of stability it moves toward on rising temperature, the curve of displacement versus temperature is shifted to the left. Conversely, if the disc is loaded by a constant force toward the position of stability it moves toward on decreasing temperature, the curve of displacement versus temperature is shifted to the right.

The curve 22 was obtained by loading the disc in a direction urging the disc toward the position of stability that it moves toward on rising temperature with a force F having a value of one-fourth pound. It should be noted that the shape of the curve 22 is similar to the shape of the curve 16 and that it is shifted to the left without any material change in the displacement pattern.

The same disc was loaded with a one-half pound load to obtain the curve 23 which again is similar to the curve 22, but is shifted to the left therefrom a distance which is substantially equal to the spacing between the curves 16 and 22. By applying a ¾-pound load to the disc, the curve 24 was obtained and the curves 25 and 26 were obtained with loadings on the disc of 1 pound and 1¼ pounds, respectively. Here again, further shifting of the curves to the left was obtained without any material distortion of the vertical axis either as to displacement or magnitude. In each case the snap point on decreasing temperature was located at a displacement position of about 0.022 inches and the snap position on increasing temperature occurred at a displacement position of about 0.012 inches. Therefore, the snap travel of the disc is not materially altered by loading nor is the location of the snap materially changed. It should also be noted that the temperature differential of operation of the disc is not materially altered by loading of the disc since the differential temperature of operation of the disc loaded with the 1¼ pound load is approximately 38° F. with operation temperatures at 80° F. and 118° F. It does appear that the loading of the disc with a uniform load does tend to reduce the temperature differential of operation to some extent, but such change is relatively minor compared to the shifting of the temperatures of operation.

Figure 1:
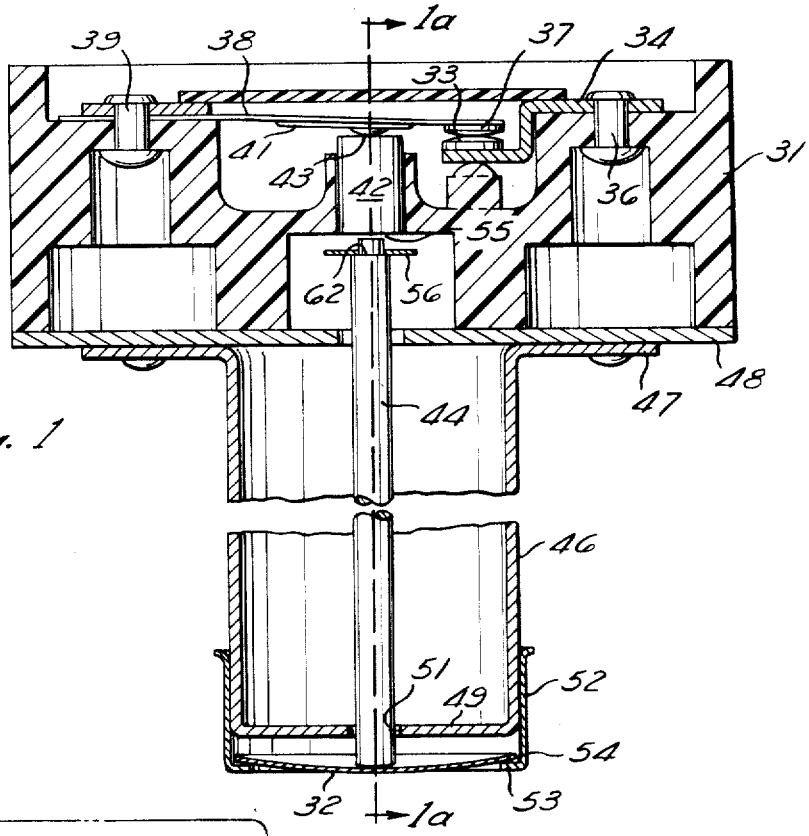
FIG. 1 is a side elevation in cross section of one form of a novel and improved adjustable thermostat utilizing a bimetallic snap disc.
Figure 1A:
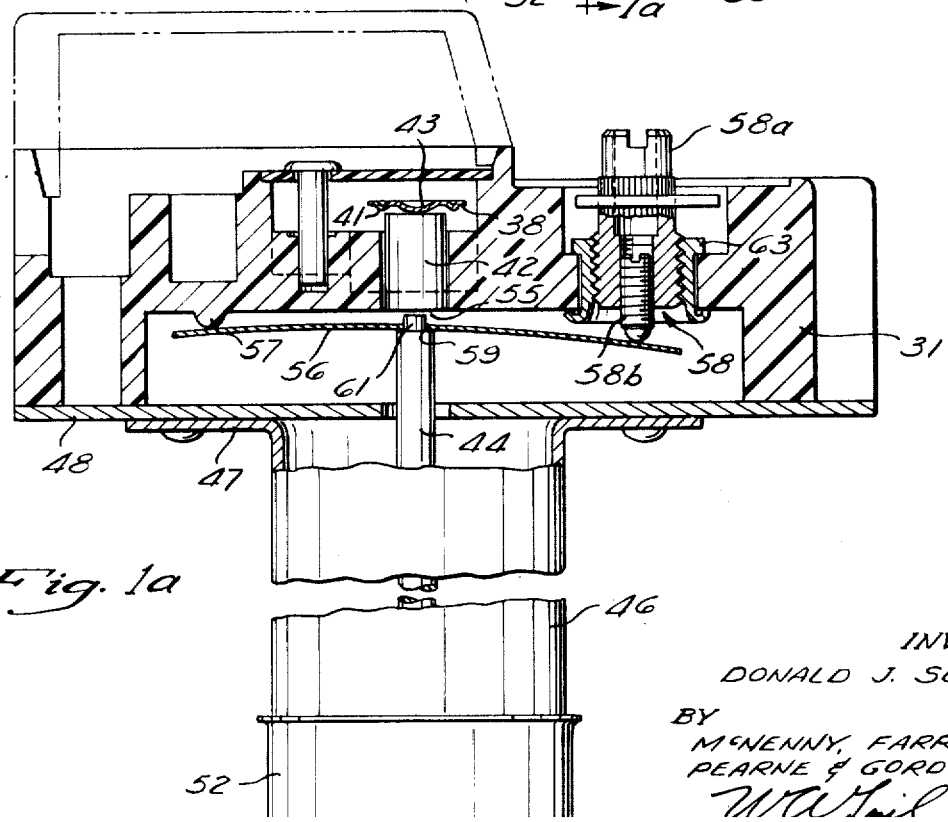
FIG. 1a is a fragmentary section taken generally along a plane at right angles to the plane of FIG. 1.

Referring to FIGS. 1 and 1a, the thermostat includes a body 31 having a switch means mounted therein which are operated by an imperforate bimetallic snap disc 32. The switch means includes a fixed contact 33 mounted on a fixed contact support 34 which is in turn connected to a thermostat terminal (not illustrated) by a mounting rivet 36. A mobile contact 37 is mounted on the free end of a spring mobile contact support arm 38 which is cantilever mounted at its other end on the body 31 by a rivet 39. The support arm 38 is provided with stiffening ribs 41 intermediate its ends. The mobile contact 37 is mounted adjacent the free end of the mobile contact support arm 38 for movement from a closed position in which it contacts the fixed contact 33 and an open position in which the two contacts 33 and 37 are spaced from each other.

Operation of the mobile contact is provided by a bumper assembly including a first bumper element 42 engageable with a projection 43 on the mobile contact support arm 38 at one end and at its other end with a bumper extension 44. The bumper extension 44 extends into engagement with the central portion of the bimetallic disc 32. The support of the bimetallic disc 32 is provided by a cylindrical support tube 46 formed with a flange 47 secured to the end plate 48 of the body 31 and provided with an end wall 49 having an aperture 51 therein through which the bumper extension 44 projects. A cup-shaped disc retainer 52 is press-fitted onto the end of the support 46 and is provided with an inturned flange 53 which engages one face of the snap disc adjacent to its periphery 54. Radical location of the snap disc is provided by the cylindrical wall of the retainer 52.

A spring 56 is mounted in the body 31 to produce a force urging the bumper extension 44 in a direction toward the snapdisc 32. In the illustrated embodiment this spring is a leaf spring supported at one end by a projection 57 formed in the body 31 and at its other end by an adjusting screw assembly 58. The screw assembly 58 includes a temperature adjusting screw 58a threaded into a mounting ring and a trim screw 58b threaded into the screw 58a. The trim screw provides the actual contact with the spring 56. The spring 56 is provided with an aperture 59 loosely receiving a reduced diameter projection 61 on the bumper extension 44 and engaging a shoulder 62. The spring 56 is provided with a relatively low spring rate so that it produces a relatively constant spring force urging the bumper extension 44 toward the disc 32 throughout the travel of the disc between the position illustrated and its opposite position of stability. This force, however, can be adjusted by rotating the adjusting screw 58a to thread it along its threaded mounting ring 63 which is mounted in the body 31. Preferably a multiple lead thread is used between the screw 58a and the ring 63 so that substantial changes in the position of the adjacent end of the spring 56 are achieved without excessive rotation of the adjusting screw assembly 58. The trim screw is used to establish calibration at the time of manufacture.

Preferably the spring 56 has a positive rate which is small when compared with the negative spring rate of the disc so that the spring 56 does not materially change the operation of the snap disc excepting to shift the operation to different temperatures. In effect the spring 56 approximates a constant force applied to the snap disc which force can be adjusted to a different but substantially constant value throughout the travel of the disc. Preferably the absolute value of the positive spring rate of the spring 56 is no more than about one-tenth of the absolute value of the negative spring rate of the disc so that its effect on the disc operation is minimal excepting for the changing of operating temperature of the thermostat.

The bumper element 42 and the bumper extension 44 are sized so that a clearance 55 is present when the disc 32 is in the position illustrated. This clearance may exist at the end of the bumper element 42 adjacent to the bumper extension 44 or at the end of the bumper element 42 adjacent to the projection 43 depending upon the mounting position of the thermostat. This clearance is sized so that the disc and at least the bumper extension 44 are in motion when the contacts open. It is preferable to form the bumper extension so that its mass which always moves with the disc is large compared to the mass of the portion of the system which starts to move when the contacts are opened. In the illustrated embodiment the bumper extension 44 is formed of metal and has a large mass compared to the bumper element 42 which is formed of plastic. The stiffening ribs stiffen the mobile support so that resilient deformation is minimized since such deformation would tend to absorb the kinetic energy of the mass in motion and would thereby reduce its effectiveness in breaking welds.

Figure 4:
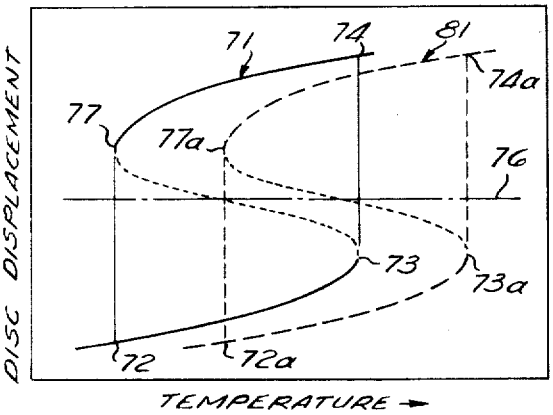
FIG. 4 is a diagram illustrating the operating characteristics of a thermostat of the type illustrated in FIGS. 1 and 1a wherein the operating temperature of the thermostat can be adjusted.

FIG. 4 illustrates the effect of adjustment of the spring 56 of the thermostat illustrated in FIGS. 1 and 1a. In this thermostat the disc is mounted so that it assumes downward position of stability, as illustrated in FIG. 1, on decreasing temperature. Therefore, increases of the force of the spring 56 shifts the curve of operation to the right toward higher temperatures. When the adjustment screw assembly 58 is positioned so that the spring 56 does not provide a substantial force on the disc 32, the thermostat follows the curve 71. At this temperature adjustment the switch contacts 33 and 37 remain closed when the temperature drops below a temperature indicated by the point 72. When the temperature increases above the temperature 72, the switch remains closed until a second higher temperature indicated by the point 73 is reached. As soon as this temperature is reached, the disc snaps to the upper portion of the curve at the point 74. The clearance 55 is preferably sized so that the switch actually opens when the disc moves through the position indicated by the line 76. When the temperature of the disc increases above the temperature indicated at 74, the switch remains open and when it drops below the temperature 74 toward the temperature indicated at 77, the switch remains open until the temperature at 77 is reached. When the temperature of the disc drops below the temperature 77, the disc snaps back to the position at 72 and the switch is closed as it moves through the position indicated by the line 76. The line of opening and closing as indicated by the line 76 is located approximately midway between the displacement positions at 73 and 77, and, therefore, the disc and the bumpers are in motion when the switch closes and opens. Therefore, very rapid action of the switching is achieved. Further, if there is any welding of the contacts which would tend to resist opening of the switch, the kinetic energy of motion of the mass in motion, at the time switch opening is initiated, is available to assist the disc force in breaking the weld and causing the switch to open. The various elements are preferably arranged so that the mass in motion immediately before the switch is opened is substantially larger than the mass which starts to move at the moment the switch opens.

When the adjustment screw assembly 58 is threaded downwardly, the force of the spring 56 urging the bumper extension 44 toward the disc is increased and this causes a shifting of the curve of operation to the right as viewed in FIG. 4. The curve 81 represents the operating characteristics of the thermostat at some adjustment position in which the force of the spring 56 is increased. When the adjustment is such that the curve 81 is followed, the switch remains closed when the temperature is below the temperature at 72a and on increasing temperature from 72a to 73a the switch remains closed. As soon as the temperature 73a is reached, the disc snaps through to the position 74a and the switch opens on passing the line 76. At temperatures of the disc above 74a, the switch remains open. As temperatures decrease from 74a to 77a, the switch remains open and upon reaching the temperature 77a, the disc snaps through to the position 72a and the switch closes.

If the force of the spring 56 is further increased by threading the adjustment screw 58 down an additional amount, the operating curve of the thermostat is shifted further to the right so that the thermostat operates at still higher temperatures. Since the displacement of the curves of operation with respect to the applied force is substantially linear, the calibration of the thermostat can be accomplished easily. With the structure illustrated in FIGS. 1 and 1a, the temperature differential of operation remains substantially constant as the operating temperature of the thermostat is changed so the manufacture of the disc must be controlled to provide the desired operating temperature differential for the thermostat. However, since the location of snapping is not materially changed, the switch operation is not affected by the temperature adjustment.

The disc 32 of the thermostat of FIGS. 1 and 1a is urged in a downward direction at all times by the spring 56. Therefore, the periphery of the disc remains in substantially constant contact with the flange 53 and there is substantially no tendency for the disc to be impacted against the flange 53 during its operation. It has been found with such an arrangement where the disc is damped by the resilient force of the spring 56, the calibration temperature of operation of the disc remains substantially constant even when the disc operates through a very large number of cycles.

In the past it has often been found that the calibration temperature of a disc changes as the disc cycles. In order to minimize such change in calibration, it has been customary to provde a heat treatment of the disc to relieve stress. Even with stress relief, changes in the calibration temperature tend to occur. However, in the present thermostat the action of the spring 56 in damping the disc movement and in maintaining the periphery of the disc against the retaining flange 53 has been found to eliminate this problem of change in disc operating temperature even when the disc is cycled a large number of times. Therefore, the spring 56 functions to improve accuracy of operation, insures that the bumper moves with the disc to provide a mass in motion which assists breaking welds, and also permits adjustment of the disc operating temperature.

Figure 5:
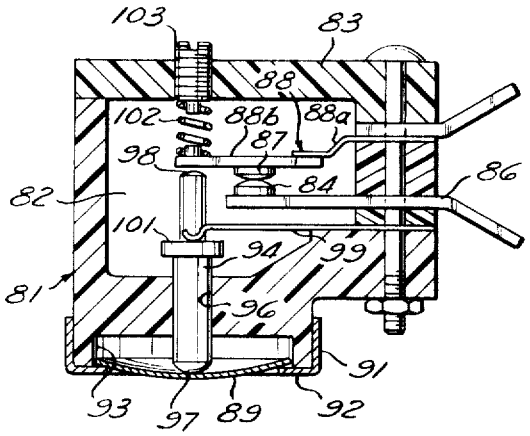
FIG. 5 is a schematic cross section of a second embodiment of a thermostat incorporating this invention wherein means are provided to reduce the operating temperature differential of the thermostat.
Figure 6:
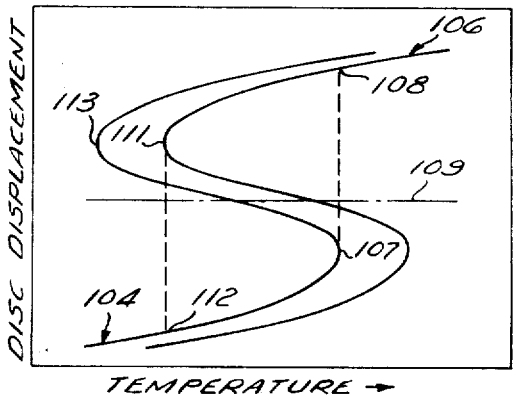
FIG. 6 is a diagram illustrating the operating characteristics of the thermostat in FIG. 5.

Referring now to FIGS. 5 and 6, the second illustrated embodiment of this invention is arranged so that the operating differential temperature of the disc can be reduced. In this embodiment a body 81 is provided with a switch chamber 82 closed at one end by a cover cover 83. A fixed contact 84 is mounted on a fixed contact support 86 and mobile contacts 87 is mounted adjacent the free end of a cantilever mounted mobile contact support 88. The mobile contact support is formed of a thin flexible section 88a and a thicker substantially rigid section 88b which is welded or otherwise secured to the flexible section. With this arrangement the mobile contact support arm tends to operate as if it were a rigid element pivoted at one end of the body. A similar effect may be obtained by providing stiffening ribs similar to the ribs 41 illustrated in FIG. 1.

A bimetallic snap disc 89 is mounted on the body 81 by a retainer ring 91 having an inturned flange 92. Radial positioning of the disc 89 is provided by a cylindrical wall 93 formed in the body 81. A bumper 94 extends through a guide opening 96 formed in the body 81 and engages at its lower end 97 the central portion of the disc 89. The bumper 94 is sized so that its upper end 98 is slightly spaced from the free end of the mobile contact support 88 when the snap disc is in the downwardly curved position illustrated in FIG. 5. A light spring element 99 is cantilever mounted on the body 81 and is provided with a forked end which engages a radial surface 101 formed on the bumper 94 on both sides of the central axis of the bumper. This light spring element 99 is sized to provide only the force necessary to maintain the bumper 94 in engagement with the disc and to maintain the periphery of the disc in engagement with the flange 92 regardless of the mounting position of the thermostat. The effect of the force of the spring 99 will be to shift the operating temperature of the disc slightly, but since the spring force is constant, such shifting of the operating temperature is consistent throughout the operational life of the thermostat.

An adjustable spring 102 is positioned at its lower end against the end of the mobile contact support 88 in alignment with the bumper 94, and at its upper end against an adjusting screw 103 which is threaded into the cover member 83. This spring 102 provides an adjustable force which urges the mobile contact 87 toward the closed position illustrated when the switch is closed and urges the disc 89 through the bumper 94 in a downward direction whenever the contacts are spaced from each other. Preferably the spring 102 is selected so that its spring rate is small when compared to the negative spring rate of the disc 89.

Referring now to FIG. 6, the snap disc is not loaded by the spring 102 when the contacts are closed. Therefore, the displacement curve 104 of the disc 89 is the active displacement curve under contact closed conditions. However, when the contacts are open, the force of the spring 102 is transmitted to the disc 89 so in contact open positions the displacement curve of the disc is shifted to the right and the disc operates along the curve 106.

Assuming now that the switch is closed, as the temperature of the disc increases from a temperature below the temperature at the position 107, the position of the disc moves along up the curve 104 to the position 107. When the temperature of the position 107 is reached, the disc snaps through to the position 108 on the curve 106. The various elements are proportioned so that the switch opens and closes along a line 109. Thereafter while the switch is open, if the temperature of the disc decreases, the position of the disc is located along the curve 106 to the right of the point 111. When a temperature of the disc is reduced until the point 111 is reached, the disc snaps back to its original position of stability and is located at the point 112 on the curve 104. The load of the spring 102 ceases to be transmitted to the disc as it passes the line 109.

With this particular arrangement the temperature differential of operation is represented by the horizontal spacing between the line 111–112 and the line 107–108. This temperature differential is less than the temperature differential of the uncompensated disc which would be equivalent to the horizontal spacing between the point 107 and 113. By adjusting the adjustiment screw 103 downwardly to increase the force of the spring 102, the curve 106 is shifted further to the right causing a further shift to the right of the line 111–112 and a further decrease in the operating differential temperature of the thermostat. With this arrangement a disc having a normal operating differential temperature of, for example, 20° F. can be used in a thermostat requiring a smaller operating temperature differential, for example, on the order of 12° F. to 15° F. Therefore, with a thermostat incorporating this invention, it is not necessary to use as much care in the manufacture of the disc and it is merely to adjust the screw 103 to obtain the desired operating temperature differential. Since the spring 102 opposes the spring force of the disc to reduce the effective system spring force available to open the contacts, it is desirable to arrange the structure so that the kinetic energy of the mass in motion, before contact opening, is large compared to the kinetic energy absorbed in accelerating the mass that starts to move at the moment the contacts open.

Figure 7:
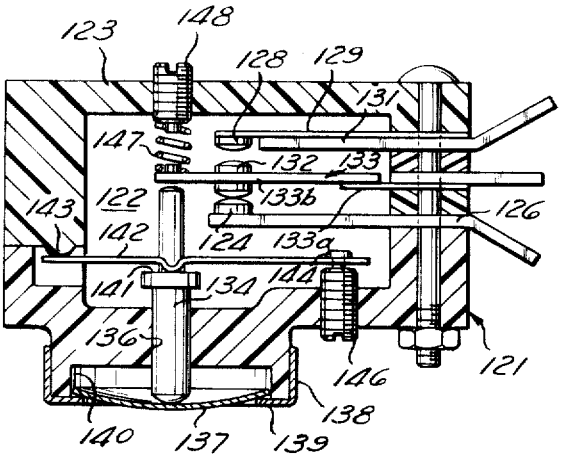
FIG. 7 is a schematic side elevation in cross section of a third embodiment of a thermostat incorporating this invention wherein both the operating temperature differential and the operating temperature of the thermostat can be adjusted.
Figure 8:
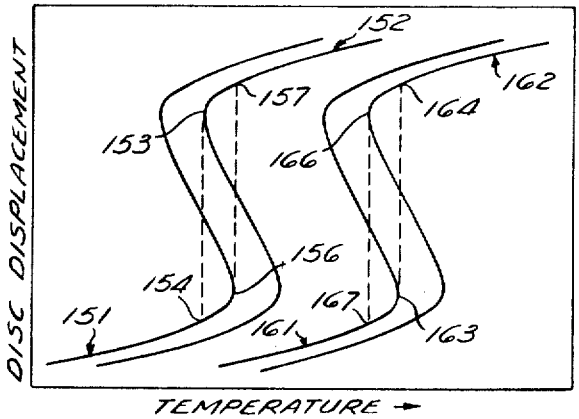
FIG. 8 is a diagram illustrating the operating characistics of the thermostat illustrated in FIG. 7.

Referring to FIGS. 7 and 8, a thermostat incorporating this invention may be provided with both operating temperature adjustment and adjustment of the operating differential temperature. In the thermostat of FIG. 7, the body 121 is again formed with a switch chamber 122 which is again closed by a cover member 123. In this illustrated embodiment of the invention the switch is a single-pole, double-throw switch of a structure which is particularly adapted for use in thermostats of this type. A lower fixed contact 124 is mounted on a contact support arm 126 adjacent the free end thereof. An upper contact 128 is mounted on the free end of a flexible contact support 129 which in this case overlies a substantially rigid stop member 131. The flexible contact support 129 is shaped so that it normally extends along the upper surface of the contact stop 131 so that the fixed contact 128 is normally maintained in the position illustrated. However, sufficient flexibility is provided in the contact support 129 to permit the contact 128 to move upwardly when it is engaged by a mobile contact.

The mobile contact 132 is mounted on a flexible mobile contact support 133 for movement between the lower position in engagement with the fixed contact 124 and an upper position in engagement with the fixed contact 128. Here again the mobile contact support 133 is formed of a flexible section 133a and a stiffer, thicker section 133b. A bumper 134 extends through a guide opening 136 in the body 121 and engages at its lower end a bimetallic snap disc 137. Here again the snap disc is mounted in the body 121 by a disc retainer 138 having a flange 139. Radial location of the disc is provided by a cylindrical wall 140 in the body 121. The bumper 134 is sized so that its upper end is slightly spaced from the free end of the mobile contact support 133 when the elements are in the position illustrated. The bumper is provided with a radial surface 141 which is engaged on opposite sides of the central axis of the bumper by a temperature adjusting spring 142. The spring 142 engages a projection 143 at one end and a head 144 on an adjusting screw 146 at its other end. The adjusting screw is threaded into the body 121 so its vertical position can be adjusted. By adjusting the screw 146 downwardly, an increased force is provided by the spring 142 urging the bumper 134 in a downward direction. Conversely upward adjustment of the screw lessens the force of the spring 142 on the bumper 134. Therefore, the spring 142, like the spring 56 of the embodiment of FIG. 1, operates to adjust the temperature of operation of the thermostat.

A second adjustable spring 147 extends between the free end of the mobile contact support 133 in alignment with the bumper 134 and a second adjusting screw 148. This spring, like the spring 102 in FIG. 5, applies a force urging the mobile contact support in a downward direction and this force is transmitted through the bumper 134 to the disc 137 only when the mobile contact 132 is spaced from the fixed contact 124. This spring adjustably reduces the operating differential temperature of the disc in a manner similar to the spring 102 in the embodiment of FIG. 5.

FIG. 8 illustrates the mode of operation of the thermostat of FIG. 7. When the adjustment screw 146 is in one position of adjustment in which only a very light force is applied to the bumper by a spring 142, the thermostat operates along the two curves 151 and 152. On decreasing temperature the disc snaps from the position of 153 on the curve 152 to the position 154 on the curve 151. On increasing temperature, the disc snaps from the position 156 on the curve 151 to the position 157 on the curve 152. Adjustment of the spring 147 determines the temperature differential of operation represented by the horizontal spacing between the line 153–154 and the line 156–157.

By adjusting the adjusting screw 146 downwardly, the operating range of the thermostat is increased and the thermostat operates along curves 161 and 162. In this adjusted position the disc snaps upwardly on increasing temperatures when the position 163 is reached to an upper position 164 on the curve 162. On decreasing temperatures the disc snaps back when the position 166 is reached to the lower position 167 on the curve 161. Adjustment of the screw 148 does not materially affect the upper temperature of the operating differential temperature so adjustment of the screw 148 does not materially alter the calibration of the thermostat. Similarly adjustment of the temperature operating screw 146 does not materially alter the operating temperature differential of the thermostat but merely shifts the range of operation.

By mounting the upper fixed contact 128 on a flexible arm, the load on the disc is not materially increased when the mobile contact 132 engages the fixed contact 128 so the disc continues upward to its stable position. This resilient mounting of the upper contact 128 reduces bounce as the mobile contact engages the upper contact. The contact stop 131 prevents a weld, if one occurs, from causing the contact 128 to remain in engagement with the mobile contact as the latter moves to its lower position and prevents shorting of the switch.

In both the embodiments of FIGS. 5 and 7, the bumper is sized so that the snap disc and the bumper are in motion at the time the initiation of movement of the mobile contact occurs. Therefore, the kinetic energy of movement is available to augment the force of the disc in breaking any welds which might exist. Here again, it is preferable to arrange the structure so that the mass in motion prior to contact with the mobile contact support is greater than the mass of the mobile contact support which must be accelerated. Difficulty in the weld between the upper contact 128 and the mobile contact 132 is not encountered because the spring 147 provides a force which is augmented by the kinetic energy of motion of the mobile contact and its support at the time these contacts open.

In a thermostat incorporating this invention, the snap disc need not be manufactured to extremely close tolerance since the adjustment can be used to compensate for variations in tolerance. Further, reliable operation is achieved since welding problems are minimized. Consequently thermostats incorporating this invention can be used to control relatively large loads such as the loads encountered in the controllling of induction motors and the like.

Figure 9:
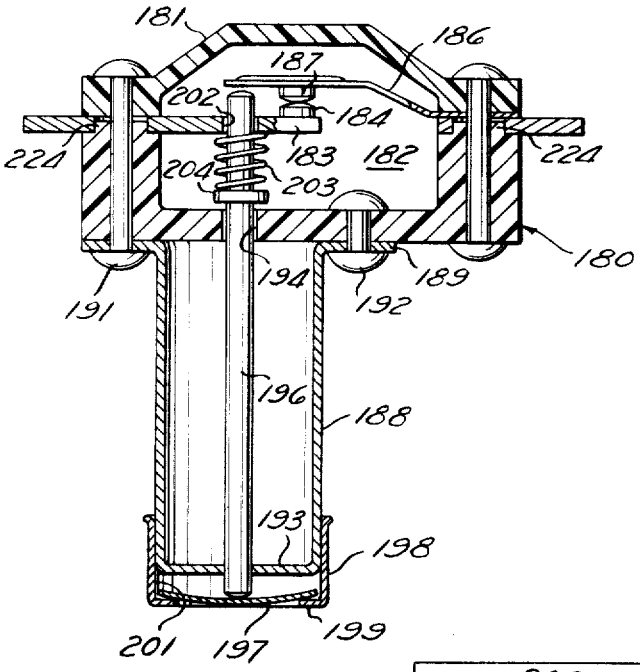
FIG. 9 is a schematic elevation in cross section of a fourth embodiment of a thermostat incorporating this invention which is arranged to operate at relatively high temperatures with relatively low differential temperatures of operation.

FIG. 9 illustrates still another embodiment of this invention. In the past it has usually been considered essentially impossible to commercially manufacture conventional bimetallic snap discs to operate at relatively high temperatures with a relatively low differential temperature of operation. For example, it has generally been considered impractical to attempt to manufacture a conventional bimetallic snap disc to operate at a temperature above about 250° F. with an operating temperature differential of below about 20° F. However, in a thermostat of the type illustrated in FIG. 9, it is possible to use a conventional bimetallic snap disc in a thermostat which operates at a higher temperature range while still retaining a relatively low operating temperature differential. For example, the thermostat in FIG. 9 may be arranged to operate at a temperature in excess of 350° F. with an operating temperature differential in the order of 10° F. to 20° F.

The thermostat illustrated in FIG. 9 includes body 180 which cooperates with a cover member 181 to form a switch chamber 182. Mounted in the switch chamber 182 between the body 180 and cover 181 is a stationary contact support 183 which is thick enough to be substantially rigid. A stationary or fixed contact 184 is mounted on the free end of the contact support 183. A flexible mobile contact support 186 is also mounted between the body 180 and the cover 181 and is provided with a mobile contact 187 which is movable into and out of engagement with the stationary contact 184.

A tubular extension 188 is provided with a flange 189 secured to the body 180 by rivets 191 and 192. The lower end of the tubular extension is provided with an apertured end wall 193 which cooperates with an opening 194 in the body 180 to laterally support a bumper element 196. A bimetallic snap disc 197 is mounted on the tubular extension by a disc retainer 198 press fitted onto the end of the tubular extension 188. The retainer 198 is again formed with a flange 199 which engages one face of the bimetallic snap disc 197 adjacent to its periphery. Here again lateral support of the disc is provided by the inner cylindrical wall 201 of the retainer 198.

The upper end of the bumper 196 extends with clearance through an opening 202 in the stationary contact support 183 to a position adjacent to the free end of the mobile contact support 186. The elements are proportioned so that clearance is provided between the upper end of the bumper 196 and the mobile contact support 186 when the contacts are closed so that the bumper and the snap disc are in motion at the time the opening of the contacts is initiated.

A coil spring 203 extends between the lower side of the stationary contact support 183 and a shoulder 204 formed on the bumper 196. The spring 203, therefore, provides a resilient biasing force urging the bumper 196 toward the disc 197 to load the disc.

The spring 203 is selected and sized to cooperate with the disc 197 to produce the desired operating characteristics for the thermostat. For example, if the disc 197, when unloaded, is manufactured to snap on temperature rise at 150° F. and on temperature decrease at 130° F., and it is desired to produce a thermostat which opens the contacts at 400° F. and closes the contacts at 390° F., the spring is selected to have a relatively low spring rate. In such a case of relatively light spring having an unstressed length substantially greater than its assembled length is selected so that, when the spring 203 is preloaded in the assembled position between the flange 204 and the stationary contact support 183, it produces a sufficient force on the disc 197 to cause the disc to operate to open the contacts on rising temperature at 400° F. The low spring rate of the spring 203 in such a thermostat will not materially reduce the operating differential temperature.

As mentioned above there is a tendency for the operating temperature differential to be reduced slightly even when the disc is loaded with a constant force. Therefore, in this instance, where the loading of the disc is relatively high to produce a large increase in the operating temperature range, this tendency may become significant. Therefore, in the thermostat of FIG. 9, this tendency of reduction in operating temperature differential should be considered when selecting the disc and rate of the spring 203 to obtain the desired operating differential.

Figure 10:
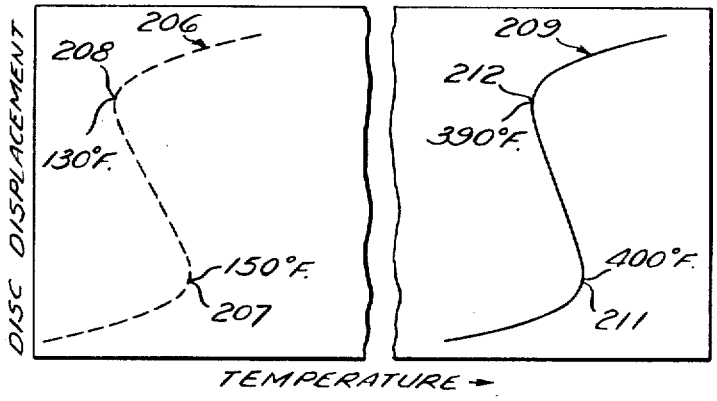
FIG. 10 is a diagram illustrating the operating characteristics of one form of the thermostat illustrated in FIG. 9.

FIG. 10 diagrammatically illustrates the operation of this thermostat as described immediately above. The curve 206 represents the operating curve of the disc 197 when it is not loaded in any way. In this curve the disc snaps upward at a position 207 when a temperature of 150° F. is reached. Similarly the disc snaps back on decreasing temperature at the point 208 when a temperature of 130° F. is reached. Therefore, the disc is considered to have a 20° F. differential in operation. Such a disc is easily manufactured by conventional procedures. However, the biasing force produced by the low rate spring 203 displaces the curve of operation of the disc to the curve 209 so that the disc operates to open the contacts on rising temperature when a temperature of, for example 400° F. is reached at the point 211 on the curve, and snaps back to the contact closed position on decreasing temperature at the point 212 when a temperature of, for example, 390° F. is reached. It should be noted that the operating temperature differential is reduced from 20° F. to 10° F. by the action of the spring 203, and that the snap temperature on decreasing temperature is substantially above the temperature at which the disc snaps on rising temperature when the disc is unloaded.

In some instances it may be desired to utilize a disc 197 having a substantially greater operating temperature differential in the unloaded condition than is desired in the assembled thermostat. In such instances a spring 203 is selected which has a higher spring rate than the spring described above. Such a spring with a higher spring rate when used in combination with a snap disc has a tendency to reduce the operating temperature differential of the snap disc. It should be pointed out, however, that the absolute value of the positive spring rate of the spring should be substantially less than the absolute value of the negative spring rate of the snap disc.

Figure 11:
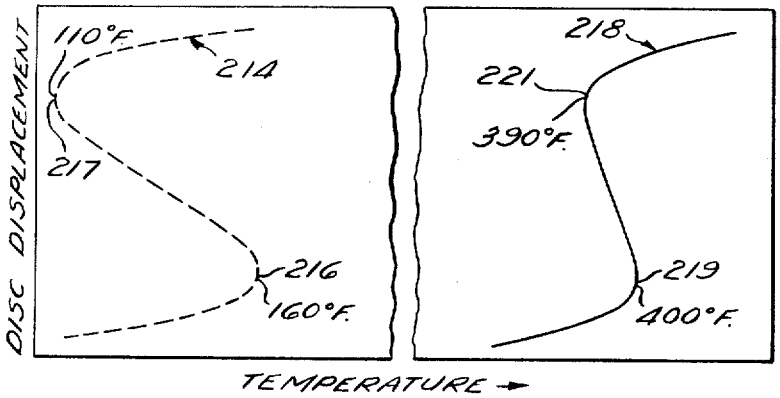
FIG. 11 is a diagram illustrating the operating characteristics of another form of the thermostat illustrated in FIG. 9.

FIG. 11 illustrates the operating characteristics of a thermostat as illustrated in FIG. 9 employing this latter arrangement. In such a thermostat, for example, the snap disc when unloaded may be manufactured to provide an operating temperature differential of 50° F. For example, such a disc represented by the curve 214 might snap through on increasing temperature at the point 216 when a temperature of 160° F. is reached and snap back on decreasing temperature at the point 217 when a temperature of 110° F. is reached. In this instance the rate of the spring 203 and the preloading thereof is selected so that, in the assembled thermostat, the operating characteristics are represented by the curve 218. In the assembled thermostat the disc snaps through on rising temperature at a point 219 when a temperature of 400° F. is reached and snaps back on decreasing temperature at the point 221 when a temperature of 390° F. is reached.

In the form represented by FIG. 10, the very low spring rate of the spring 203 does not produce any substantial change in the shape of the curve of operation, but mainly shifts the curve to the right. However, in the form represented by the curve in FIG. 11, the higher spring rate of the spring 203 in combination with the preloading of the spring performs the dual function of increasing the operating temperature range and also decreasing the operating temperature differential.

It should be noted that in this embodiment, the spring reduces the operating differential and is active in all positions of the disc whereas in the embodiments of FIGS. 5 and 7 the temperature differential reducing spring is active only during the portion of movement wherein the contacts are opening or are opened.

In a thermostat of the type illustrated in FIG. 9 wherein high temperatures are encountered, the use of the tubular extension 188 is desirable since it permits the disc to be located in the high temperature zone and the switch body and switch mechanism to be remotely located in a lower temperature zone so that the switching mechanism and the body are not to be exposed to damaging high temperatures.

In the thermostat illustrated in FIG. 9, the body 180 is formed with projections 224 which insulate the rivets from the contact support arms and the bumper 196 is formed of non-conducting material so that the disc is electrically isolated from the contacts. If a metal bumper is to be used in the portion extending beyond the body 180 along the tubular extension 188, a two-piece bumper structure may be used wherein the upper portions of the bumper are formed of insulating material so that the disc will not be electrically connected to the switching structure.

Although preferred embodiments of this invention are illustrated, it is to be understood that various modifications and arrangements may be resorted to without departing from the scope of the invention disclosed.

I claim:

1. An adjustable thermostat comprising body means, a switch on said body means including a fixed contact and a mobile contact movable into and out of engagement with said fixed contact to open and close said switch, a bimetallic substantially smoothly dished snap disc supported at its periphery on said body, said snap disc having a central portion movable between first and second positions determined substantially entirely by the dished shape of said disc with snap action in response to temperature changes, operator means operably connected to said central portion operable to open and close said switch in response to movement of said central portion of said snap disc between said positions after said snap disc is in snap motion, an adjustable load means on said thermostat connected to bias said central portion of said disc toward one position with a force which is adjustable, changes in the force of said load means changing the operating temperature of said disc without materially changing said first and second positions and without materially changing the differential temperature of said thermostat as a result of said adjustment.

2. An adjustable thermostat as set forth in claim 1 wherein said disc is imperforate, and said operator means includes a bumper engageable at one end with the central portion of said disc and engageable at its other end with said mobile contact, said bumper being sized to provide lost motion to insure that said disc is in snap motion when said switch operates.

3. An adjustable thermostat as set forth in claim 2 wherein said load means biases said bumper toward said disc and maintains contact therebetween.

4. An adjustable thermostat as set forth in claim 3 wherein said disc is peripherally mounted in said body means with axial clearance, and said load means prevents substantial axial movement of said periphery within said clearance.

5. An adjustable thermostat as set forth in claim 1 wherein said snap disc has a negative spring rate as it moves between said positions, and said load means includes a load spring with a positive spring rate which has an absolute value substantially less than said negative spring rate so that the force thereof applied to said disc does not produce substantial change in the effective negative spring rate of said disc.

6. An adjustable thermostat as set forth in claim 1 wherein the kinetic energy of the mass in motion of said disc and operator means before contact opening is substantially larger than the kinetic energy of the mass in motion of said mobile contact when said mobile contact is being moved by said disc.

7. An adjustable thermostat as set forth in claim 6 wherein said fixed contact is mounted on said body means so that it is fixed against movement when said contacts open, and mobile contact support means are provided which are sufficiently rigid to prevent the absorption of appreciable amounts of kinetic energy when movement of said mobile contact is initiated in a direction away from said fixed contact.

8. An adjustable thermostat as set forth in claim 1 wherein second load means are provided to urge said mobile contact toward said fixed contact with a force which is substantially constant in all positions of said mobile contact.

9. An adjustable thermostat as set forth in claim 8 wherein said snap disc has a negative spring rate as it moves between said positions and said second load means includes a spring with a spring rate having an absolute value substantially less than said negative spring rate so that the force thereof applied to said mobile contact does not produce a substantial change in the effective negative spring rate of the system when said disc is moving said mobile contact.

10. An adjustable thermostat as set forth in claim 9 wherein a cantilever mounted mobile contact support is mounted in said body means and said mobile contact is mounted thereon adjacent to its free end, and said operator means engages said cantilever mounted support adjacent to its free end.

11. An adjustable thermostat as set forth in claim 9 wherein the kinetic energy of the mass in motion of said disc and operator means is substantially larger than the kinetic energy of the mass in motion of said mobile contact when said mobile contact is being moved by said disc.

12. An adjustable thermostat as set forth in claim 9 wherein said operator means is a bumper engageable at one end with the central portion of said disc and engageable at its other end with said mobile contact, said bumper being proportioned to engage said mobile contact and initiate movement thereof in a direction away from said fixed contact when said snap disc is moving toward a switch position and is substantially midway between its two said positions.

13. An adjustable thermostat as set forth in claim 1 wherein said load means is a leaf spring supported in said body at one location and is operatively connected to said operator means at a second location spaced from said one location, and adjusting means are provided at a third location spaced from the other locations to change the force of said load spring on said operator means and thereby change the operating temperature of said thermostat.

14. An adjustable thermostat as set forth in claim 13 wherein said operator means is connected to said leaf spring intermediate its ends, and said adjustment means is provided adjacent to one end of said leaf spring.

15. An adjustable thermostat as set forth in claim 1 wherein said body means includes an elognated extension assembly, said disc is mounted on the end of said extension assembly remote from said switch, and said operating means is a rodlike assembly extending the length of said extension, said extension assembly providing means to laterally position said disc and at least an end of said rodlike assembly.

16. An adjustable thermostat as set forth in claim 1 wherein the force of said adjustable load means on said disc is substantially constant during said snap movement.

17. An adjustable therostat comprising body means, a switch on said body including a first fixed contact and a mobile contact movable into and out of engagement with said fixed contact to open and close said switch, a generally circular imperforate bimetal snap disc peripherally mounted on said body means having a central portion movable with snap action between first and second positions in response to temperature changes, bumper means on said body having one end engageable with said central portion of said disc and the other end engageable with said mobile contact, said bumper means being proportioned so that it initiates movement of said mobile contact in a direction away from said fixed contact when said disc is moving toward said second position and is substantially midway between said first and second positions, and adjustable spring means on said thermostat connected to apply an adjustable force to said mobile contact urging it toward said fixed contact whereby adjustment of the force of said spring means changes the temperature differential of disc operation, said spring means having a sufficiently low spring rate so that the force thereon applied to said mobile contact is substantially constant in all positions of said mobile contact, a mobile contact support cantilever mounted on said body means and supporting said mobile contact adjacent to its free end, said bumper being engageable with said mobile contact support adjacent to its free end.

18. An adjustable thermostat as set forth in claim 17 wherein said spring applies its force adjacent to the free end of said mobile contact support on the side opposite said bumper.

19. An adjustable thermostat as set forth in claim 17 wherein said switch includes a second substantially fixed contact means mounted on the side of said mobile contact opposite said first fixed contact, said second fixed contact means being mounted for limited movement with said mobile contact when engaged thereby and providing a stop limiting movement thereof toward said first fixed contact to a pretedmined position so that said mobile contact cannot simultaneously engage both of said fixed contacts.

20. A thermostat comprising body means, a switch mounted on said body means including a fixed contact and a mobile contact movable into and out of engagement with said fixed contact to open and close said switch, a substantially smoothly dished bimetallic snap disc loosely mounted at its periphery in said body with axial clearance and having a central portion movable between first and second positions determined substantially entirely by the dished shaped of said disc with snap action in response to temperature changes, operating means connected to open and close said switch in response to movement of said central portion of said disc between said positions after said disc is in snap motion, and adjustable spring means on said body connected to product a force in all positions of said disc urging said disc toward one of said positions to adjust the operating temperature of said disc and maintain said disc on one side of said clearance, said snap disc having a negative spring rate as it moves between said positions, said load spring having a spring rate having an absolute value which is less than the absolute value of said negative spring rate of said disc, said thermostat being free of positive restraints for limiting the movement of said central portion of said snap disc.

21. A thermostat as set forth in claim 20 wherein said disc is shaped so that when it is in its free state and unloaded it snaps on increasing temperature at a first temperature, and said spring means produce sufficient force on said disc so that said disc snaps on decreasing temperature at a second temperature which is substantially higher than said first temperature.

22. A thermostat as set forth in claim 21 wherein said disc when unloaded has a first operating differential temperature, and when loaded by said spring means has a second operating differential temperature which is less than said first operating differential temperature.

23. A thermostat as set forth in claim 22 wherein said spring means has a sufficiently high spring rate to produce a substantial reduction in the operating differential temperature of said disc.

24. A thermostat as set forth in claim 20 wherein said spring means has a sufficiently high spring rate to produce a substantial reduction in the operating differential temperature of said disc.

25. A thermostat as set forth in claim 20 wherein said disc is shaped so that when it is in its free state and unloaded it snaps on rising temperature at a temperature below 250° F. with an operating temperature differential of at least 25° F., and said spring means is operable to cause said disc to snap on rising temperature at above 300° F. with an operating temperature differential of less than 20° F.

26. A thermostat as set forth in claim 20 wherein adjustment means are provided to adjust the force of said load spring, said load spring having a sufficiently low spring rate so that the force thereof on said disc is substantially constant in all positions of said disc.

27. A thermostat as set forth in claim 20 wherein the force produced by said spring means urges said operator means toward said disc and maintains said operator means in contact with said disc.

28. A thermostat comprising body means, a switch mounted on said body means including a fixed contact and a mobile contact movable into and out of engagement with said fixed contact to open and close said switch a substantially smoothly dished bimetallic snap disc loosely mounted at its periphery in said body with axial clearance and having a central portion movable between first and second positions determined substantially entirely by the dished shape of said disc with snap action in response to temperature changes, operating means connected to open and close said switch in response to movement of said central portion of said disc between said positions after said disc is in snap motion, a fixed contact support mounted on said body, said fixed contact being mounted on said fixed contact support, and spring means extending between said fixed contact support and said operating means producing a force in all positions of said disc urging said disc toward one of said positions to modify the operating temperature of said disc and maintain said disc on one side of said clearance, said snap disc having a negative spring rate as it moves between said positions, said spring means having a spring rate having an absolute value which is less than the absolute value of said negative spring rate of said disc, said thermostat being free of positive restraints for limiting the movement of said central portion of said snap disc.

29. A thermostat as set forth in claim 28 wherein said fixed contact support is formed with an aperture, said operating means is provided with an elongated portion extending through said aperture and a radially extending surface spaced from said fixed contact support, and said spring means extends between said radially extending surface and said fixed contact support.

30. A thermostat comprising body means, a switch mounted on said body means including a fixed contact and a mobile contact movable into and out of engagement with said fixed contact to open and close said switch, a smoothly dished bimetallic snap disc mounted on said body means having a central portion movable with snap action between two positions of stability in response to temperature changes, said disc having a negative spring rate as it moves between said positions, operator means connected to open and close said switch in response to movement of said central portion of said disc between said positions after said disc is in snap motion, and adjustable spring means on said body with a positive spring rate having an absolute value which is less than the absolute value of said negative spring rate of said disc applying a force to said central portion in all positions of said disc urging said central portion toward one of said positions, said spring means reducing the differential temperature of said disc, said thermostat being free of positive restraints for limiting the movement of said central portion of said snap disc.

31. A thermostat as set forth in claim 30 wherein adjustment of said spring means changes the operating temperature of said thermostat.

*32. An adjustable thermostat as set forth in claim 2 wherein said disc is peripherally mounted in said body*

*means with axial clearance, and said load means prevents substantial axial movement of said pehiphery within said clearance.*

*33. An adjustable thermostat as set forth in claim 1 wherein second load means are provided to urge said mobile contact toward said fixed contact in all positions of said mobile contact.*

*34. An adjustable thermostat as set forth in claim 33 wherein a cantilever-mounted mobile contact support is mounted in said body means and said mobile contact is mounted adjacent its free end, and said operator means engages said cantilever-mounted support between the mounting end thereof and said mobile contact.*

*35. An adjustable thermostat as set forth in claim 34 wherein said operator means is a bumper engageable at one end with the central portion of said disc and engageable at its other end with said mobile contact, said bumper being proportioned to initiate movement thereof in a direction away from said fixed contact when said snap disc is moving toward a switch open position and is substantially mid-way between its two said positions.*

*36. A thermostat as set forth in claim 20 wherein said disc when unloaded has a first operating differential temperature, and when loaded by said spring means a second operating differential temperature which is less than said first operating differential temperature.*

*37. A thermostat as set forth in claim 31 wherein separate spring means are provided on said body urging said mobile contact toward engagement with said fixed contact in all positions of said mobile contact.*

References Cited

The following references, cited by the Examiner, are of record in the patented file of this patent or the original patent.

UNITED STATES PATENTS

| | | | |
|---|---|---|---|
| 2,288,818 | 7/1942 | Marcy | 337—347 |
| Re. 26,554 | 3/1969 | Bletz | 337—347 |
| 2,999,142 | 9/1961 | Woodhall et al. | 337—348 |
| 3,081,388 | 3/1963 | Cox | 337—348 |
| 3,164,702 | 1/1965 | Ruckreigel et al. | 337—346 |
| 3,453,581 | 7/1969 | Moro | 337—349 |
| 3,500,278 | 3/1970 | Them | 337—354 |
| 2,111,609 | 3/1938 | Bolesky | 337—391 |
| 2,066,162 | 12/1936 | Spencer | 236—48 |
| 2,039,358 | 5/1936 | Spencer | 236—80 |
| 2,015,545 | 9/1935 | Bletz et al. | 337—347 |
| 1,972,832 | 9/1934 | Spenser | 337—391 |
| 1,958,594 | 5/1934 | Spencer | 337—365 X |
| 1,845,997 | 2/1932 | Spencer | 337—347 |
| 3,355,563 | 11/1967 | Ruckreigel | 337—354 |
| 2,331,408 | 10/1943 | Marcy | 337—343 X |
| 2,153,297 | 4/1939 | Butler | 337—343 X |

FOREIGN PATENTS

| | | | |
|---|---|---|---|
| 596,423 | 7/1958 | Italy | 337—354 |
| 1,035,515 | | Great Britain. | |

OTHER REFERENCES

White-Rodgers, Product Information (Series 3A00).

JD MILLER, Primary Examiner

F. E. BELL, Assistant Examiner

U.S. Cl. X.R.

337—354, 368